United States Patent Office 3,640,923
Patented Feb. 8, 1972

3,640,923
POLYENES CURED WITH POLYTHIOLS WITH IRON COMPOUNDS AND OXIME ESTERS AS ACCELERATORS
James L. Guthrie, Ashton, Md., assignor to W. R. Grace & Co., New York, N.Y.
No Drawing. Filed Nov. 12, 1968, Ser. No. 775,198
Int. Cl. C08b 21/08; C08f 27/06
U.S. Cl. 260—13
22 Claims

ABSTRACT OF THE DISCLOSURE

This invention relates to accelerated curing under ambient conditions of a liquid composition comprising a polyene containing at least two reactive unsaturated carbon to carbon bonds per molecule and a polythiol containing at least two thiol groups per molecule, the total combined functionality of (a) the reactive unsaturated carbon to carbon bonds per molecule in the polyene and (b) the thiol groups per molecule in the polythiol being greater than four, in the presence of a curing rate accelerator comprising a catalytic amount of iron and its compounds. The addition of a minor amount of an oxime ester to the system allows one to cure in an inert atmosphere. The polythioethers formed can be used as adhesives.

---

In the adhesive field today, especially when adhering metals, the main adhesive employed is the epoxy class of adhesives. However, the epoxy type adhesives have several drawbacks. One of the main drawbacks is that the curing rate even at elevated temperatures in excess of 250° F. are not rapid enough to make the system commercially feasible. That is, curing times of 1 hour or more at 250° F. are necessary to obtain a hardened fully cured adhesive.

Recently, we have discovered that polyenes containing at least two unsaturated carbon to carbon bonds per molecule in combination with a polythiol and a photosensitizer can be cured by exposure to actinic radiation. These combinations make admirable adhesives but, of necessity for U.V. curing, the material to be bonded must be U.V. transparent. Further work with these compositions has shown them to be curable adhesives when heat is applied for extended periods, e.g. 250° F. for 1 day. Such a curing rate is however commercially unacceptable.

One object of the instant invention is to provide a liquid curable composition which can be cured rapidly within time periods ranging from 1 second up to 1 hour. Another object of the instant invention is to provide liquid curable compositions which can be cured under ambient conditions. Another object is to provide liquid curable compositions which can be cured under inert conditions. These and other objects will become apparent from a reading hereinafter.

Summarily, the above and other objects are obtained by forming a liquid curable composition comprising a polyene containing at least two reactive unsaturated carbon to carbon bonds per molecule and a polythiol containing at least two thiol groups per molecule, the total combined functionality of (a) the unsaturated carbon to carbon bonds per molecule in the polyene and (b) the thiol groups per molecule in the polythiol being greater than four and a catalytic amount of a curing rate accelerator comprising iron or its compounds. Exposure of the thus formed liquid composition containing the curing rate accelerator to ambient conditions results in a solid, self-supporting cured polythioether. The addition of minor amounts of an oxime ester to the liquid composition containing the curing rate accelerator causes curing to a solid, self-supporting cured polythioether even under inert conditions, e.g. in an argon atmosphere.

The amount of iron in the curing rate accelerator operable in the liquid polyene/polythiol composition is in the range 0.0001–0.01 percent by weight based on the liquid polyene/polythiol composition, preferably 0.0010–0.005 percent by weight.

Iron compounds which are operable in the instant invention as curing rate accelerators are many and varied and include both organic and inorganic compounds. Thus, for example, operable compounds include, but are not limited to, iron, iron salts such as sulfate, nitrate, ferricyanide, ferrorcyanide, chloride, ammonium sulfate and the like. Organic iron salts are also operable and include, but are not limited to, oxalate, stearate, naphthenate, citrate and iron chelate compounds such as acetylacetonate, benzoylacetophenonate, ferrocene and the like. Other operable iron compounds include, but are not limited to, iron acetate, iron orthoarsenate, iron orthoarsenite, iron boride, iron hydroxide, iron iodide, iron lactate, iron malate, iron oleate, iron oxide, iron pyrophosphate, iron metasilicate, iron sulfide, iron sulfite, iron thiocyanate, and the like. The aforesaid list of iron compounds is merely illustrative and by no means exhaustive, suffice it to say that any iron containing material in the operable amount set out herein will cause relatively rapid curing of the polyene/polythiol composition under ambient conditions.

The amount of oxime ester employed is in the range 0.1 to 5% by weight based on the liquid polyene/polythiol composition.

Operable oximes esters which can be added to the liquid polyene/polythiol composition containing the curing rate accelerator of the instant invention and cause curing under inert conditions are many and varied. Examples of operable oximes esters include, but are not limited to, dimethylglyoxime dibenzoate, quinone dioxime dimethoxybenzoate, quinone dioxime dichlorobenzoate, diphenylglyoxime dibenzoate, glyoxime dibenzoate, quinone dioxime diacetate, terephthalaldehyde dioxime dibenzoate, dimethylglyoxime diacetate, dimethylglyoxime distearate, quinone dioxime dibenzoate, dimethylglyoxime monoacetate, quinone dioxime dibenzenesulfonate, dimethylglyoxime monobenzoate, terephthalaldehyde dioxime monobenzoate, furil dioxime distearate, diphenylglyoxime distearate, dimethylglyoxime adipate, terephthalaldehyde dioxime distearate, 3 - phenyl - 4,5 - dihydro-6-oxo-1,2-oxazine, cyclohexanone oxime benzoate, 4-benzoylbutyric acid oxime benzoate, quinone dioxime dinitrobenzoate, 2,4-pentanedione dioxime dibenzoate, quinone dioxime distearate, benzoylpropionic acid oxime benzoate, quinone dioxime diheptanoate, cycloheptanone oxime benzoate, 2-methylcyclohexanone oxime benzoate, 1-phenyl-1,2-propanedione dioxime distearate, glyoxime distearate, 2,4-pentanedione dioxime distearate, quinone dioxime dibutyrate, benzophenone oxime stearate, benzaldoxime benzoate, benzaldoxime stearate, glyoxime diacetate, levulinic acid oxime benzoate, and the like. Various other oxime esters are obvious to one skilled in the art and are operable herein.

The polythiols and one group of operable polyenes which can be cured rapidly are set out in a copending application assigned to the same assignee having Ser. No. 617,801 and filed Feb. 23, 1967 and now abandoned and are incorporated herein by reference. Said application having Ser. No. 617,801 has foreign counterparts i.e., French Ser. No. 115,824 filed July 26, 1967 which is now French Pat. 1,567,036 and Italian application having Ser. No. 18,444 filed July 26, 1967 which is now Italian Pat. No. 816,569 both of which are also incorporated herein by reference. That is, one group of polyenes operable in the instant invention are those having a molecular weight in the range 50 to 20,000, a viscosity ranging from 0 to 20 million centipoises at 70° C. of the general formula: $[A]-(X_m)$ wherein X is a member of the group consisting of

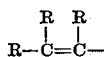

and $R-C\equiv C-$; $m$ is at least 2; R is independently selected from the group consisting of hydrogen, halogen, aryl, substituted aryl, cycloalkyl, substituted cycloalkyl, aralkyl, substituted aralkyl and alkyl and substituted alkyl groups containing 1 to 16 carbon atoms and A is a polyvalent organic moiety free of (1) reactive carbon to carbon unsaturation and (2) unsaturated groups in conjugation with the reactive ene or yne groups in X. Thus A may contain cyclic groupings and minor amounts of hetero atoms such as N, S, P or O but contains primarily carbon-carbon, carbon-oxygen or silicon-oxygen containing chain linkages without any reactive carbon to carbon unsaturation.

Examples of said operable polyenes include, but are not limited to (1) crotyl-terminated polyurethanes which contain two "reactive" double bonds per average molecule in a near terminal position of the average general formula:

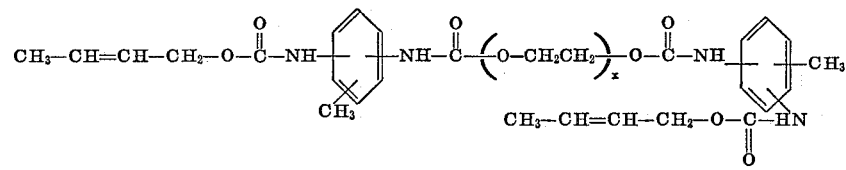

wherein $x$ is at least 1, (2) ethylene/propylene/non-conjugated diene terpolymers, such as "Nordel 1040" manufactured by Du Pont which contains pendant "reactive" double bonds of the formula: $-CH_2-CH=CH-CH_3$, (3) the following structure which contains terminal "reactive" double bonds:

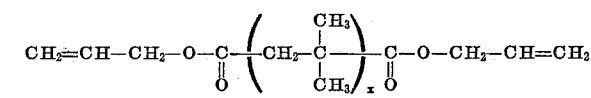

where $x$ is at least 1, and (4) the following structure which contains near terminal "reactive" double bonds

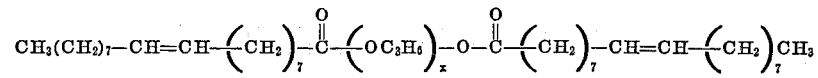

where $x$ is at least 1.

As used herein polyenes and polyynes refer to simple or complex species of alkenes or alkynes having a multiplicity of pendant, terminally or near terminally positioned "reactive" carbon to carbon unsaturated functional groups per average molecule. For example, a diene is a polyene that has two "reactive" carbon to carbon double bonds per average molecule, while a diyne is a polyyne that contains in its structure two "reactive" carbon to carbon triple bonds per average molecule. Combinations of "reactive" double bonds and "reactive" triple bonds within the same molecule are also possible. An example of this is monovinylacetylene, which is a polyeneyne under our definition. For purposes of brevity all these classes of compounds will be referred to hereafter as polyenes.

A second group of polyenes operable in the instant invention includes unsaturated polymers in which the double or triple bonds occur primarily within the main chain of the molecules. Examples include conventional elastomers (derived primarily from standard diene monomers) such as polyisoprene, polybutadiene, styrene-butadiene rubber, isobutylene-isoprene rubber, polychloroprene, styrene-butadiene-acrylonitrile rubber and the like; unsaturated polyesters, polyamides, and polyurethanes derived from monomers containing "reactive" unsaturation, e.g. adipic acid-butenediol, 1,6-hexanediamine-fumaric acid and 2,4-tolylene diisocyanate-butenediol condensation polymers and the like.

A third group of polyenes operable in this invention includes those polyenes in which the reactive unsaturated carbon to carbon bonds are conjugated with adjacent unsaturated groupings. Examples of operable reactive conjugated ene systems include, but are not limited to, the following:

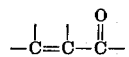

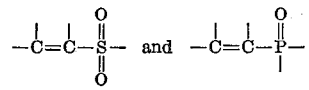

A few typical examples of polymeric polyenes which contain conjugated reactive double bond groupings such as those described above are poly(ethylene ether) glycol diacrylate having a molecular weight of about 750, poly (tetramethylene ether) glycol dimethacrylate having a molecular weight of about 1175, the triacrylate of the reaction product of trimethylolpropane with 20 moles of ethylene oxide, and the like.

As used herein for determining the position of the reactive functional carbon to carbon unsaturation, the term "terminal" means that said functional unsaturation is at an end of the main chain in the molecule; whereas by "near terminal" is meant that the functional unsaturated is not more than 16 carbon atoms away from an end of the main chain in the molecule. The term "pendant" means that the reactive carbon to carbon unsaturation is located terminally or near-terminally in a branch of the main chain as contrasted to a position at or near the ends of the main chain. For purposes of brevity all of these positions will be referred to generally as "terminal" unsaturation.

The liquid polyenes operable in the instant invention contain one or more of the following types of non-aromatic and non-conjugated "reactive" carbon to carbon unsaturation:

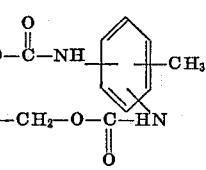

These functional groups as shown in 1-8 supra are situated in a position either which is pendant, terminal or near terminal with respect to the main chain but are free of terminal conjugation. As used herein the phrase "free of terminal conjugation" means that the terminal "reactive" unsaturated groupings may not be linked directly to non-reactive unsaturated species such as

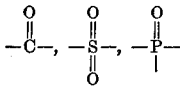

and the like so as to form a conjugated system of unsaturated bonds exemplified by the following structure:

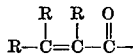

etc. On the average the polyenes must contain 2 or more "reactive" unsaturated carbon to carbon bonds/molecule and have a viscosity in the range from 0 to 20 million centipoises at 70° C. Included in the term "polyenes" as used herein are those materials which in the presence of an inert solvent, aqueous dispersion or plasticizer fall within the viscosity range set out above at 70° C. Operable polyenes in the instant invention have molecular weights in the range 50–20,000, preferably 500 to 10,000.

As used herein the term "reactive" unsaturated carbon to carbon groups means groups having the structures as shown in 1-8 supra which will react under proper conditions as set forth herein with thiol groups to yield the thioether linkage

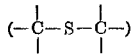

as contrasted to the term "unreactive" carbon to carbon unsaturation which means

groups when found in aromatic nucleii (cyclic structures exemplified by benzene, pyridine, anthracene, tropolone and the like) which do not under the same conditions react with thiols to give thioether linkages. In the instant invention products from the reaction of polyenes with polythiols which contain 2 or more thiol groups per average molecule are called polythioether polymers as polythioethers.

As used herein, the term polythiols refers to simple or complex organic compounds having a multiplicity of pendant or terminally positioned —SH functional groups per average molecule.

On the average the polythiols must contain 2 or more —SH groups/molecule. They usually have a viscosity range of 0 to 20 million centipoises (cps.) at 70° C. as measured by a Brookfield Viscometer. Included in the term "polythiols" as used herein are those materials which in the presence of an inert solvent, aqueous dispersion or plasticizer fall within the viscosity range set out above at 70° C. Operable polythiols in the instant invention usually have molecular weights in the range 50–20,000, preferably 100–10,000.

The polythiols operable in the instant invention can be exemplified by the general formula: $R_8$—$(SH)_n$ where $n$ is at least 2 and $R_8$ is a polyvalent organic moiety free from reactive carbon to carbon unsaturation. Thus $R_8$ may contain cyclic groupings and minor amounts of hetero atoms such as N, S, P or O but primarily contains carbon-hydrogen, carbon-oxygen, or silicon-oxygen containing chain linkages free of any reactive carbon to carbon unsaturation.

One class of polythiols operable with polyenes in the instant invention to obtain essentially odorless polythioether products are esters of thiol-containing acids of the general formula: HS—$R_9$—COOH where $R_9$ is an organic moiety containing no "reactive" carbon to carbon unsaturation with polyhydroxy compounds of the general structure: $R_{10}$—$(OH)_n$ where $R_{10}$ is an organic moiety containing no "reactive" carbon to carbon unsaturation and $n$ is 2 or greater. These components will react under suitable conditions to give a polythiol having the general structure:

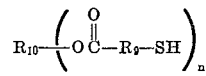

where $R_9$ and $R_{10}$ are organic moieties containing no "reactive" carbon to carbon unsaturation and $n$ is 2 or greater.

Certain polythiols such as the aliphatic monomeric polythiols (ethane dithiol, hexamethylene dithiol, decamethylene dithiol, tolylene - 2,4 - dithiol, etc. and some polymeric polythiols such as a thiol-terminated ethylcyclohexyl dimercaptan polymer, etc. and similar polythiols which are conveniently and ordinarily synthesized on a commercial basis, although having obnoxious odors, are operable in this invention but many of the end products are not widely accepted from a practical, commercial point of view. Examples of the polythiol compounds preferred for this invention because of their relatively low odor level include but are not limited to esters of thiogylcolic acid (HS—$CH_2$COOH), α-mercaptopropionic acid (HS—CH($CH_3$)—COOH and β-mercaptopropionic acid (HS—$CH_2CH_2$COOH) with polyhydroxy compounds such as glycols, triols tetraols, pentaols, hexaols, etc. Specific examples of the preferred polythiols include but are not limited to ethylene glycol bis (thioglycolate), ethylene glycol bis (mercaptopropionate), trimethylolpropane tris (thioglycolate), trimethylolpropane tris (β-mercaptopropionate), pentaerythritol tetrakis (thioglycolate) and pentaerythritol tetrakis (β-mercaptopropionate), all of which are commercially available. A specific example of a preferred polymeric polythiol is polypropylene ether glycol bis (β-mercaptopropionate) which is prepared from polypropylene-ether glycol (e.g. Pluracol P2010, Wyandotte Chemical Corp.) and β-mercaptopropionic acid by esterification.

The preferred polythiol compounds are characterized by a low level of mercaptan-like odor initially, and after reaction, give essentially odorless polythioether end products which are commercially attractive and practically useful resins or elastomers for both indoor and outdoor applications.

As used herein the term "liquid curable compositions" means a liquid composition having a viscosity in the range 0 to 20 million centipoises at 70° C. which is solidified by curing on addition of the curing rate accelerator disclosed herein under ambient conditions.

The term "functionality" as used herein refers to the average number of ene or thiol groups per molecule in the polyene or polythiol, respectively. For example, a triene is a polyene with an average of three "reactive" carbon to carbon unsaturated groups per molecule and thus has a functionality (f) of three. A polymeric dithiol is a polythiol with an average of two thiol groups per molecule and thus has a functionality (f) of two.

It is further understood and implied in the above definitions that in these systems, the functionality of the polyene and the polythiol component is commonly expressed in whole numbers although in practice the actual functionality may be fractional. For example, a polyene component having a nominal functionality of 2 (from theoretical considerations alone) may in fact have an effective functionality of somewhat less than 2. In an attempted synthesis of a diene from a glycol in which the reaction proceeds to 100% of the theoretical value for complete reaction, the functionality (assuming 100% pure starting materials) would be 2.0. If however, the reaction were carried to only 90% of theory for complete reaction, about 10% of the molecules present would have only one ene functional group, and there may be a trace of material that would have no ene functional groups at all. Approximately 90% of the molecules, however, would have the desired diene structure and the product as a whole then would have an actual functionality of 1.9. Such a product is useful in the instant invention and is referred to herein as having a functionality of 2.

The aforesaid polyenes and polythiols can, if desired, be formed or generated in situ and still be rapidly cured by the process of the instant invention.

To obtain the maximum strength, solvent resistance, creep resistance, heat resistance and freedom from tackiness, the reaction components consisting of the polyenes and polythiols of this invention are formulated in such a manner as to give solid, crosslinked, three dimensional network polythioether polymer systems on curing. In order to achieve such infinite network formation the individual polyenes and polythiols must each have a functionality of at least 2 and the sum of the functionalities of the polyene and polythiol components must always be greater than 4. Blends and mixtures of the polyenes and the polythiols containing said functionality are also operable herein.

The compositions to be cured, i.e. (converted to solid resins or elastomers), in accord with the present invention may, if desired, include such additives as antioxidants, dyes, inhibitors, activators, fillers, pigment, anti-static agents, flame-retardant agents, thickeners, thixotropic agents, surface-active agents, viscosity modifiers, extending oils, plasticizers, tackifiers and the like within the scope of this invention. Such additives are usually pre-blended with the polyene or polythiol prior to or during the compounding step. Operable fillers include natural and synthetic resins, carbon black, glass fibers, wood flour, clay, silica, alumina, carbonates, oxides, hydroxides, silicates, glass flakes, glass beads, borates, phosphates, diatomaceous earth, talc, kaolin, barium sulfate, calcium sulfate, calcium carbonate, antimony oxide and the like. The aforesaid additives may be present in quantities up to 500 parts or more per 100 parts of the liquid polyene/polythiol composition by weight and preferably 0.005–300 parts on the same basis.

In all the curable liquid systems herein the compositions consists of 2 to 98 parts by weight of a polyene containing at least 2 reactive unsaturated carbon to carbon bonds per molecule, 98 to 2 parts by weight of a polythiol containing at least 2 thiol groups per molecule and 0.001 to 0.01 part by weight of a curing rate accelerator with 0.1 to 5% by weight of the composition of an oxime ester as a synergistic agent for the curing rate accelerator being added for more rapid curing or for curing under inert conditions or by actinic radiation, e.g. U.V. light.

The compounding of the components prior to curing can be carried out in several ways. Since the oxime esters used in this invention do not by themselves under ambient conditions have a catalytic effect on the curing of polyenes with polythiols but only act as a synergistic agent for the iron-containing curing rate accelerator and since iron and its compounds used in this invention act as a catalyst by themselves only in the presence of air, it is possible to compound the components into a two component system in which each component is stable but when mixed together would cure. For example, one component might contain an iron compound dissolved in the polyene. Each component would be unreactive by itself, but when mixed together the mixture would cure very rapidly. Such a system might be applicable in a two component adhesive. In another variation, all ingredients except the iron compound might be mixed to give a stable system. However, the addition of an iron compound would cause very rapid curing. The iron compound could be deposited in solution or as a dust in a pattern electrostaticially or by other methods to cause complete curing or selective curing only in certain regions of a curable polymer. Still another method is to dissolve the curing rate accelerator with or without the oxime ester synergistic agent in a plasticizer, e.g. "Benzoflex 9–88" commercially available from Carlisle Chemical Corp. which is thereafter admixed in the polyene followed by admixing the polythiol into the system when curing is desired. Various other compounding procedures are obvious to one skilled in the art.

The following examples will aid in explaining but expressly not limit the instant invention. Unless otherwise noted, all parts and percentages are by weight.

PREPARATION OF POLYENE

Example 1

To a 2 liter flask equipped with stirrer, thermometer and gas inlet and outlet was charged 450 g. (0.45 moles) of poly(tetramethylene ether) glycol, having a hydroxyl number of 112 and a molecular weight of 1000, along with 900 g. (0.45 moles) of (polytetramethylene) ether glycol having a hydroxyl number of 56 and a molecular weight of 2000, both commercially available from Quaker Oats Co. The flask was heated to 110° C. under vacuum and nitrogen and maintained thereat for 1 hour. The flask was then cooled to approximately 70° C. whereat 0.1 g. of dibutyl tin dilaurate was added to the flask. A mixture of 78 g. (0.45 moles) of tolylene diisocyanate and 78 g. (0.92 moles) of allyl isocyanate was thereafter added to the flask dropwise with continuous stirring. The reaction was maintained at 70° C. for 1 hour after addition of all the reactants. The thus formed allyl terminated prepolymer will hereinafter be referred to as Prepolymer A.

POLYENE/POLYTHIOL CURING

Example 2

30 g. of Prepolymer A from Example 1 were admixed in an aluminum weighing dish with 5 g. of plasticizer commercially available from Velsicol Chemical Corp. under the trade name "Benzoflex 988", 0.15 g. of cyclohexanone oxime benzoate and 6 g. of titanium dioxide (an inert filler). To the aforesaid mixture was added a solution of 3 milligrams of ferric acetylacetonate in 2.3 g. of pentaerythritol tetrakis ($\beta$-mercaptopropionate) commercially available from Carlisle Chemical Co. under the trade name "Q43" with stirring. The mixture became hard and rubbery in approximately 30 seconds. After 24 hours the solid cured polythioether product was removed from the aluminum weighing dish. The polythioether product had a Shore A hardness of 60.

Example 3

Example 2 was repeated except that no cyclohexanone oxime benzoate was added to the mixture. The curing reaction required approximately 30 minutes to reach the state of cure which it had obtained in Example 2 in 30 seconds. After 24 hours the cured polythioether product had a Shore A hardness of 32.

Example 4

Example 2 was repeated using oxime esters other than cyclohexanone oxime benzoate. Oxime esters employed, each in the amount of 0.15 g. were glyoxime dibenzoate, dimethylglyoxime dibenzoate, 2 - methylcyclohexanone oxime benzoate, cycloheptanone oxime benzoate and 3-phenyl-4,5-dihydro-6-oxo-1,2-oxazine. The results in all cases were substantially the same as in Example 2.

Example 5

0.15 g. of cyclohexanone oxime benzoate were dissolved in 30 g. of Prepolymer A from Example 1 and heated in a flask at 50° C. The flask was magnetically stirred and evacuated at 1 milliliter pressure for 2 hours to remove oxygen. Simultaneously, an addition funnel containing 3 mg. of ferric acetylacetonate in 2.3 ml. of pentaerythritol tetrakis ($\beta$-mercaptopropionate) was mounted on the flask and was also evacuated. Following removal of the air, the stopcock was opened so that the two components could mix in the absence of air. The mixture cured immediately as shown by the fact that by the time half of the pentaerythritol tetrakis ($\beta$-mercaptopropionate) and iron solution had been added (approximately 1 minute) stirring was no longer possible. This example demonstrates that air is not needed for the reaction to proceed when the oxime ester is present. A control run under the same conditions except that no oxime ester was present failed to cure the polyene polythiol mixture until the flask was opened to the atmosphere.

Example 6

Example 2 was repeated except that 3 milligrams of ferric ammonium sulfate was substituted for the 3 milligrams of ferric acetylacetonate. The mixture became hard and rubbery in approximately 1 minute. After 24 hours the solid cured polythioether product on characterization had a Shore A hardness greater than 30.

Example 7

Example 2 was repeated except that 4 milligrams of ferric naphthenate was substituted for the ferric acetylacetonate. A solid cured polythioether product was removed from the aluminum weighing dish within 5 minutes.

Example 8

Example 2 was repeated except that 3 milligrams of iron filings was substituted for the ferric acetylacetonate. A solid cured polythioester product resulted within 5 minutes.

The following examples show that the curing rate accelerator can also be activated by U.V. radiation.

Example 9

The reactants of Example 2 were employed and were exposed to U.V. radiation from a 275 watt Sylvania sun lamp. After 2 minutes, a hard solidified cured polythioether product resulted.

In a control run using the reactants and procedure herein except that the cyclohexanone oxime benzoate and ferric acetylacetonate were omitted, the reaction required over 2 hours of U.V. radiation under the same conditions to obtain a hard solidified cured polythioether.

The solid cured polythioether polymer products resulting from the instant invention have many and varied uses. Examples of some uses include, but are not limited to, adhesives; caulks, elastomeric sealants; liquid castable elastomers, thermoset resins; laminating adhesives, and coatings; mastics; and the like.

The curable liquid polymer compositions containing the curing rate accelerator of the instant invention prior to curing can be pumped, poured, brushed, sprayed, doctored, rolled, trowelled, dip-coated, extruded or gunned into place, into molds, into cavities, into ducts, or onto vertical or horizontial flat surfaces in a uniform fashion. Following such application curing in place to a solid resin or an elastomer can be made to occur very rapidly. The compositions can be applied to various substrates and adhere well to glass, wood, metals, concrete, certain plastics, paints, enamels, fabrics, paper, paperboard, porcelain, ceramics, brick, cinder block and plaster.

The liquid polythioether-forming components and compositions of the instant invention can, prior to curing, be admixed with or blended with other monomeric and polymeric materials such as thermoplastic resins, elastomers or thermosetting resin monomeric or polymeric compositions. The resulting blend can be subjected to conditions for curing or co-curing of the various components of the blend to give cured products having unusual physical properties. Examples of the classes of the materials which can be admixed, blended or co-cured with the polythioether-forming compositions of the instant invention are illustrated by, but not limited to, the following: epoxy resins, phenolic resins, polysulfide resins, and elastomers, polyurethane resins and elastomers, polyamide resins, polyvinyl chloride resins, amphorous or crystalline polyolefins, polyacrylonitrile polymers, silicone polymers, urea-formaldehyde resins, polyether resins and elastomers and the like.

What is claimed is:

1. In curable composition consisting essentially of (1) a polyene containing at least two unsaturated carbon to carbon bonds per molecule reactive with polythiols, (2) a polythiol free of reactive carbon to carbon unsaturation and containing at least two thiol groups per molecule, the total combined functionality of (a) the reactive unsaturated carbon to carbon bonds per molecule in the polyene and (b) the thiol groups per molecule in the polythiol being greater than four, the improvement comprising the presence of a curing rate accelerator comprising 0.001 to 0.01 percent by weight of the polyene/polythiol composition of an iron containing material.

2. The curable composition of claim 1 containing in addition 0.1 to 5% by weight of the polyene/polythiol composition of a synergistic agent for the curing rate accelerator consisting of an oxime ester.

3. The composition according to claim 2 wherein the oxime ester synergistic agent is a member of the group consisting of dimethylglyoxime dibenzoate, quinone dioxime dimethoxybenzoate, quinone dioxime dichlorobenzoate, diphenylglyoxime dibenzoate, glyoxime dibenzoate, quinone dioxime diacetate, terephthalaldehyde dioxime dibenzoate, dimethylglyoxime diacetate, dimethylglyoxime distearate, quinone dioxime dibenzoate, dimethylglyoxime monoacetate, quinone dioxime dibenzenesulfonate, dimethylglyoxime monobenzoate, terephthalaldehyde dioxime monobenzoate, furil dioxime distearate, diphenylglyoxime distearate, dimethylglyoxime adipate, terephthalaldehyde dioxime distearate, 3-phenyl14,5-dihydro-6-oxo-1,2-oxazine, cyclohexanone oxime benzoate, 4-benzoylbutyric acid oxime benzoate, quinone dioxime dinitrobenzoate, 2,4-pentanedione dioxime dibenzoate, quinone dioxime distearate, benzoylpropionic acid oxime benzoate, quinone dioxime diheptanoate, cycloheptanone oxime benzoate, 2-methylcyclohexanone oxime benzoate, 1-phenyl-1,2-propanedione dioxime distearate, glyoxime distearate, 2,4-pentanedione dioxime distearate, quinone dioxime dibutyrate, benzophenone oxime stearate, benzaldoxime benzoate, benzaldoxime stearate, glyoxime diacetate, and levulinic acid oxime benzoate.

4. The curable composition according to claim 1 where the polyene is the reaction product of polytetramethylene ether glycol having a molecular weight of about 1,000, polytetramethylene ether glycol having a molecular weight of about 2,000, tolylene diisocyanate and allyl isocyanate in a mole ratio of 1:1:1:2 respectively.

5. The curable composition according to claim 1 wherein the polyene is a styrene/butadiene rubber.

6. The curable composition according to claim 1 wherein the polyene is the reaction product of polytetramethylene ether glycol having a molecular weight of about 2,000 and allyl isocyanate in a mole ratio of 1:2 respectively.

7. The curable composition according to claim 1 wherein the polyene is the reaction product of a solid polyester diol and allyl isocyanate in a mole ratio of 1:2 respectively.

8. The curable composition according to claim 1 wherein the polyene is the reaction product of polyoxypropylene diol having a molecular weight of about 2,000, tolylene 2,4-diisocyanate and allyl alcohol in a mole ratio of 1:2:2 respectively.

9. The curable composition according to claim 1 wherein the polyene is the reaction product of a phthalate or succinate esterol derived from polytetramethylene ether glycol and allyl isocyanate having a molecular weight of about 4,000.

10. The curable composition according to claim 1 wherein the polyene is the reaction product of polytetramethylene ether glycol having a molecular weight of about 3,000 and allyl isocyanate in a mole ratio of 1:2 respectively.

11. The curable composition according to claim 1 wherein the polyene is the reaction product of polyoxypropylene triol having a mole ratio of 1:3 respectively.

12. The curable composition according to claim 1 wherein the polyene is poly-1,3-butadiene.

13. The curable composition according to claim 1 wherein the polyene is triallyl urea.

14. The curable composition according to claim 1 wherein the polyene is cellulose acetate methacrylate.

15. The curable composition according to claim 1 wherein the polyene is the reaction product of 1,4-butadienediol and allyl isocyanate in a mole ratio of 1:2 respectively.

16. In the process of curing the composition consisting essentially of (1) a polyene containing at least two unsaturated carbon to carbon bonds per molecule reactive with polythiol, and (2) free of reactive carbon to carbon unsaturation and containing at least two thiol groups per molecule, the total combined functionality of (a) the reactive unsaturated carbon to carbon bonds per molecule in the polyene and (b) the thiol groups per molecule in the polythiol being greater than four and the weight ratio of the polyene to the polythiol being 2 to 98: 98 to 2, the improvement whereby the curing is accelerated under ambient conditions which comprises adding to the composition 0.0001 to 0.01 percent by weight of the polyene/polythiol composition of a curing rate accelerator comprising an iron-containing material.

17. The process according to claim 16 wherein 0.01 to 5% by weight of the polyene/polythiol composition of a synergistic agent for the curing rate accelerator consisting of an oxime ester is added to the system.

18. The process of curing to a hardened mass a liquid curable composition consisting essentially of (1) a polyene containing at least two unsaturated carbon to carbon bonds per molecule, (2) a polythiol reactive with polythiols containing at least two thiol groups per molecule, the total combined functionality of (a) the reactive unsaturated carbon to carbon bonds per molecule in the polyene and (b) the thiol groups per molecule in the polythiol being greater than four, which comprises adding to the composition 0.0001 to 0.01 percent by weight of the polyene/polythiol composition of a curing rate accelerator comprising an iron-containing material and exposing the composition to ambient conditions.

19. The process according to claim 18 wherein 0.01 to 5% by weight of the polyene/polythiol composition of a synergistic agent for the curing rate accelerator consisting of an oxime ester is added to the system.

20. The process according to claim 19 wherein the oxime ester is a member of the group consisting of dimethylglyoxime dibenzoate, quinone dioxime dimethoxybenzoate, quinone dioxime dichlorobenzoate, diphenylglyoxime dibenzoate, glyoxime dibenzoate, quinone dioxime diacetate, terephthalaldehyde dioxime dibenzoate, dimethylglyoxime diacetate, dimethylglyoxime distearate, quinone dioxime dibenzoate, dimethylglyoxime monoacetate, quinone dioxime dibenzenesulfonate, dimethylglyoxime monobenzoate, terephthalaldehyde dioxime monobenzoate, furil dioxime distearate, diphenylglyoxime distearate, dimethylglyoxime adipate, terephthalaldehyde dioxime distearate, 3-phenyl-4,5-dihydro-6-oxo-1,2-oxazine,, cyclohexanone oxime benzoate, 4-benzoylbutyric acid oxime benzoate, quinone dioxime dinitrobenzoate, 2,4-pentanedione dioxime dibenzoate, quinone dioxime distearate, benzoylpropionic acid oxime benzoate, quinone dioxime diheptanoate, cycloheptanone oxime benzoate, 2-methylcyclohexanone oxime benzoate, 1-phenyl-1,2-propanedione dioxime distearate, glyoxime distearate, 2,4-pentanedione dioxime distearate, quinone dioxime dibutyrate, benzophenone oxime stearate, benzaldoxime benzoate, benzaldoxime stearate, glyoxime diacetate, and levulinic acid oxime benzoate.

21. The process of curing to a hardened mass a liquid curable composition consisting essentially of (1) a polyene containing at least two unsaturated carbon to carbon bonds per molecule reactive with polythiols and (2) a polythiol free of reactive carbon to carbon unsaturated and containing at least two thiol groups per molecule, which comprises adding to the composition 0.0001 to 0.01 percent by weight of the polyene/polythiol composition of a curing rate accelerator comprising an iron-containing material and 0.1 to 5% by weight of the polyene/polythiol composition of a synergistic agent for the curing rate accelerator consisting of an oxime ester and exposing the composition to U.V. radiation.

22. The process according to claim 21 wherein the oxime ester is a member of the group consisting of dimethylglyoxime dibenzoate, quinone dioxime dimethoxybenzoate, quinone dioxime dichlorobenzoate, diphenylglyoxime dibenzoate, glyoxime dibenzoate, quinone dioxime diacetate, terephthalaldehyde dioxime dibenzoate, dimethylglyoxime diacetate, dimethylglyoxime distearate, quinone dioxime dibenzoate, dimethylglyoxime monoacetate, quinone dioxime dibenzenesulfonate, dimethylglyoxime monobenzoate, terephthalaldehyde dioxime monobenzoate, furil dioxime distearate, diphenylglyoxime distearate, dimethylglyoxime adipate, terephthalaldehyde dioxime distearate, 3-phenyl-4,5-dihydro-6-oxo-1,2-oxazine, cyclohexanone oxime benzoate, 4-benzoylbutyric acid oxime benzoate, quinone dioxime dinitrobenzoate, 2,4-pentanedione dioxime dibenzoate, quinone dioxime distearate, benzoylpropionic acid oxime benzoate, quinone dioxime oiheptanoate, cycloheptanone oxime benzoate, 2-methylcyclohexanone oxime benzoate, 1-phenyl-1,2-propanedione dioxime distearate, glyoxime distearate, 2,4-pentanedione dioxime distearate, quinone dioxime dibutyrate, benzophenone oxime stearate, benzaldoxime benzoate, benzaldoxime stearate, glyoxime diacetate, and levulinic acid oxime benzoate.

References Cited

UNITED STATES PATENTS

| | | | |
|---|---|---|---|
| 2,767,156 | 10/1956 | Tawney | 260—41.5 |
| 3,041,304 | 6/1962 | Gardner | 260—41.5 |
| 3,226,356 | 12/1965 | Kehr | 260—41 |
| 3,240,844 | 3/1966 | Gruver | 260—894 |
| 3,305,517 | 2/1967 | Kehr | 260—41 |
| 3,338,810 | 8/1967 | Warner | 204—159.18 |

JOSEPH L. SCHOFER, Primary Examiner

C. A. HENDERSON, Jr., Assistant Examiner

U.S. Cl. X.R.

117—123, 127, 152; 161—190; 204—159.18, 159.24; 260—41 B, 41 AG, 41.5 A, 75 UA, 77.5 AP, 78 UA, 79.5 R, 79.5 B, 79.5 C, 775, 779, 823

UNITED STATES PATENT OFFICE
CERTIFICATE OF CORRECTION

Patent No. 3,640,923        Dated 2/8/72

Inventor(s) James L. Guthrie

It is certified that error appears in the above-identified patent and that said Letters Patent are hereby corrected as shown below:

Claim 16, column 11, line 4, after the numeral "(2)" add the words - a polythiol -. Claim 21, column 12, line 5, delete the word "unsaturated" and add the word -unsaturation-.

Signed and sealed this 20th day of June 1972.

(SEAL)
Attest:

EDWARD M. FLETCHER, JR.      ROBERT GOTTSCHALK
Attesting Officer               Commissioner of Patents